United States Patent [19]

Howell et al.

[11] 4,017,731
[45] Apr. 12, 1977

[54] METHOD AND APPARATUS FOR PROSPECTING FOR BURIED MINERAL DEPOSITS

[75] Inventors: Eddie P. Howell; Orland J. Gant, Jr., both of Plano, Tex.

[73] Assignee: Atlantic Richfield Company, Los Angeles, Calif.

[22] Filed: Apr. 12, 1976

[21] Appl. No.: 675,872

Related U.S. Application Data

[63] Continuation of Ser. No. 542,309, Jan. 20, 1975, abandoned.

[52] U.S. Cl. ............................................. 250/253
[51] Int. Cl.² ......................................... G01V 5/00
[58] Field of Search ........................ 250/255, 253; 23/230 EP

[56] References Cited

UNITED STATES PATENTS

| | | | |
|---|---|---|---|
| 2,562,969 | 8/1951 | Teichmann | 250/253 |
| 2,775,710 | 12/1956 | Ludeman | 250/253 |
| 3,180,983 | 4/1965 | Hall | 250/255 |
| 3,609,363 | 9/1971 | Milly | 250/253 |
| 3,665,194 | 5/1972 | Alter | 250/253 |
| 3,968,371 | 7/1976 | Greendale | 250/255 |

Primary Examiner—Harold A. Dixon
Attorney, Agent, or Firm—Robert M. Betz

[57] ABSTRACT

Radioactive gaseous decay products emanating from a buried deposit of uranium or other radioactive ore migrate upwardly through the earth and are exhaled into the atmosphere. These products may be trapped at the surface in a series of low profile, dome-shaped plastic shelters 5 to 20 feet in diameter. Radiant energy permeating each shelter cover heats the soil beneath the enclosed surface area to accelerate the escape of gas through the soil. The air confined within the shelters is continuously recirculated over the exposed surfaces of a plurality of highly adsorbent discs. After equilibrium decay conditions are reached, the discs are analyzed to determine the radioactivity of the discs, which is proportional to the concentration of radioactive gas in the vicinity.

9 Claims, 6 Drawing Figures

METHOD AND APPARATUS FOR PROSPECTING FOR BURIED MINERAL DEPOSITS

CROSS-REFERENCES TO RELATED APPLICATIONS

This application is a continuation of application Ser. No. 542,309 filed Jan. 20, 1975, now abandoned.

BACKGROUND OF THE INVENTION

1. Field of the Invention

This invention is generally related to the field of geophysical prospecting and more particularly to a method and apparatus for prospecting for buried mineral deposits such as uranium and thorium which is based upon the detection of radioactive decay products emanating from such deposits and exiting from the earth's surface into the atmosphere.

2. Description of the Prior Art

It is well-known that mineral deposits such as uranium and thorium give rise to emanations of radioactive gaseous decay products such as radon which migrate upwardly through the rock and soil of the earth by diffusion and transport.

A method of detection of the presence of such deposits consists in drilling holes in a geologically favorable area, evacuating a quantity of gas from the substrata region under consideration, and thereafter measuring by known techniques the quantity of a particular radioactive isotope present in the gas. This method suffers from the drawback, however, that even in the vicinity of a radioactive mineral deposit the gas sample collected from a given well may be a poor indicator. It is known that the fractures or channels characteristic of crustal rock provide high speed, directional transport paths for radioactive gas, for example, radon-222. However, a single bore hole may conceivably extend to a depth of several hundred feet without intersecting more than a small number of such microfractures. Conversely, such a bore hole may fortuitously intersect a very large number of such paths. In either case, the readings taken from such bore holes may not be representative of the average gas concentration in the vicinity and thus may not accurately predict the location and probable contour of a buried radioactive deposit such as uranium.

Another method of detecting the presence of subsurface radioactive deposits consists in the detection and tracking of windblown gaseous clouds in the atmosphere arising from radioactive decay products diffusing upwardly through the earth. The airborne gas and decay products thereof can allegedly be detected by means of observations over the ground surface and at points removed from the deposits by significant distance. This method is exemplified by U.S. Pat. No. 3,609,363 and depends for its success upon "the application of meteorological knowledge concerning cloud travel and detection, to govern the observational regime and the interpretation of measurements." Windblown gas decay products, however, are generally regarded as weak indicators of the presence of subsurface radioactive deposits. There are many atmospheric anomalies which are difficult, if not impossible, to predict. For example, radon, along with other gases, tends to be trapped in inversion layers. If the inversion clears up, the gas will disperse. Furthermore, radon clouds may travel extremely long distances in the air from the location of an ore body before they are detected.

In an effort to employ the technique described, the cited patent proposes, after detection and general localization of an area of interest, to outline the ore body itself. This is said to be done "by capping the emanating soil surface to trap the gaseous products at a succession of points over the area in question." There is no indication given of the size, areal extent, shape, material, or method of positioning the proposed collection containers. As will become apparent from the description to follow, these features may influence directly the value of the collected gas samples as an indicator of the presence of radioactive isotopes and the contour of the buried deposit or deposits responsible for the presence of such decay products.

Still another surface exploration technique for locating buried ore bodies typically involves placement of small inverted cups in shallow covered holes on the order of 2 to 3 feet deep in the vicinity of interest. Sensitive film may be positioned within the cups and left for a period of time to arrive at equilibrium conditions. For the same reasons referenced above, the sampling of gas concentration in the soil in accordance with such a method may not predict with consistent accuracy the presence or contour of buried ore bodies.

SUMMARY OF THE INVENTION

It is a general object of this invention to provide a method for determining the presence of subsurface radioactive mineral deposits by detection at the surface of their radioactive decay products.

It is a further object of this invention to provide an improved apparatus for collecting at the surface soil gases exhaled into the atmosphere and measuring the concentrations in which they are present.

It is a more specific object of this invention to provide a method of detection of radioactive gas migrating through the earth to its surface whereby the contour of an underlying radioactive ore deposit may be more accurately predicted.

It is a still further object of this invention to provide a method of detection of gaseous products exiting into the atmosphere from the earth wherein the rate of escape of gases trapped near the surface is accelerated.

These are other objects and advantages of the applicants' method and apparatus will become clear from a consideration of the detailed description to follow taken in conjunction with the drawings appended thereto.

In one embodiment, the applicants' method generally comprehends enclosing an air space over each of a plurality of spaced apart surface areas of predetermined magnitude at the surface of the earth confining within said air spaces the radioactive gaseous decay products exhaled into the atmosphere from the earth across said respective surface areas, exposing the surface areas to radiant heat to increase the upward rate of escape from the soil of said gaseous decay products, shielding the air spaces from external atmospheric contaminants, collecting said confined gaseous decay products by filtration or other means, and measuring and comparing the concentration of the collected gas samples after substantial decay equilibrium is reached.

The method may be practiced by positioning a plurality of spaced apart gas collection shelters on the earth's surface in an area of interest. Each such shelter consists of a low profile, smoothly curved, dome-shaped tent anchored to the ground and provided with an effective air seal around its periphery. The covering material of the shelter is selected so that it is highly permeable to infrared radiation. Means may be provided for continuous recirculation of the trapped air over highly adsorbent surfaces which filter out and collect radioactive decay products or other gases of interest for subsequent quantitative and qualitative analysis.

In an alternate embodiment, the invention comprehends a plurality of similar collection shelters adapted to float on the surface of the water. Each such shelter may incorporate a small spray system to help the escape of trapped gases from the water into the atmosphere confined within the tent.

DESCRIPTION OF THE PREFERRED EMBODIMENTS

Figure 1:
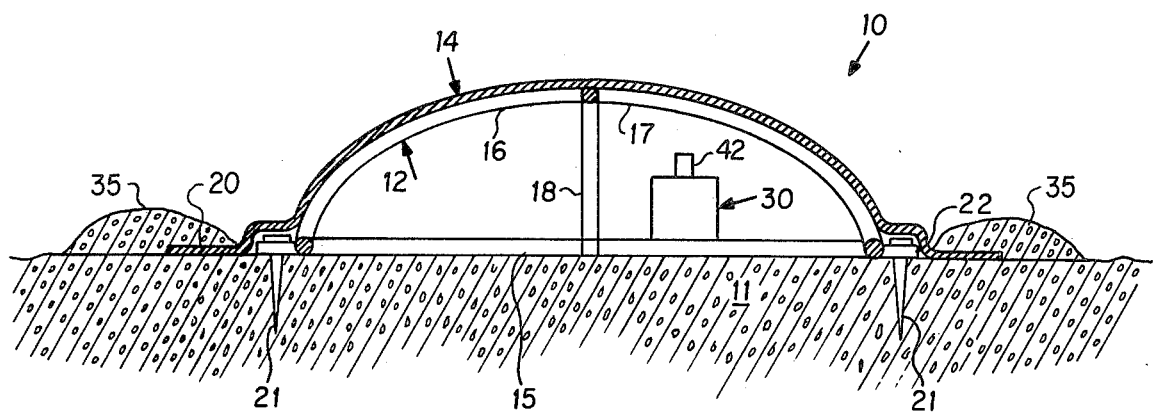
FIG. 1 is a vertical section, partly diagrammatic, of a gas collection shelter in accordance with this invention.
Figure 2:
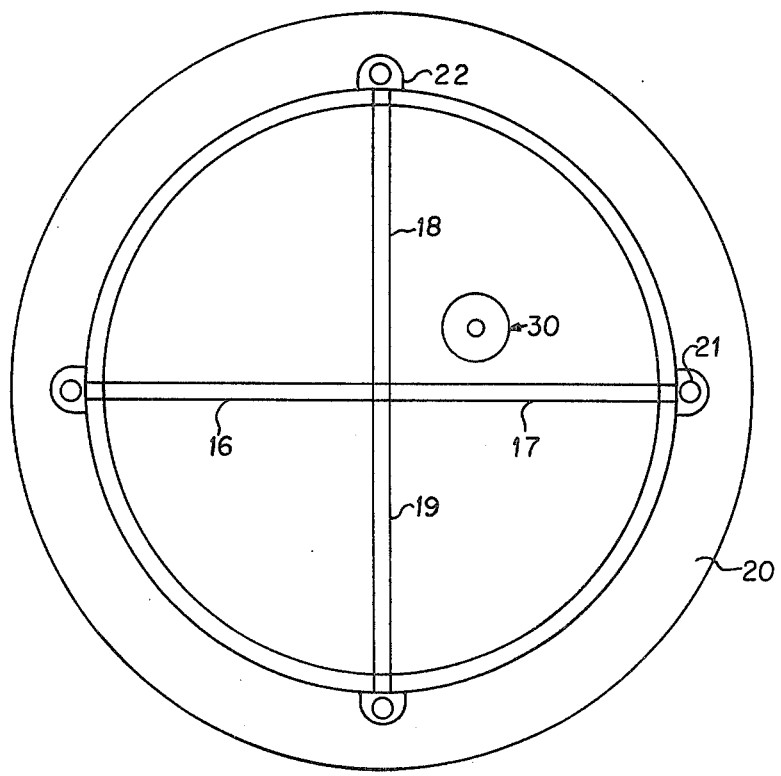
FIG. 2 is a diagrammatic plan view of the shelter of FIG. 1.

With reference now to FIGS. 1 and 2 of the drawings, there is illustrated a gas collection shelter 10 resting on the surface of the earth 11. The shelter 10 consists generally of a rigid, easily-disassembled frame structure 12, preferably of lightweight tubular aluminum, which supports a removable outer cover 14. The frame structure 12 is composed of a generally circular base 15 forming the perimeter of the shelter 10 and smoothly curved upper support members exemplified by characters 16, 17, 18, and 19 suitably interconnected to establish the dome shape of the shelter 10. It is believed, for reasons to be explained hereafter, that improved results in accordance with this invention may be achieved in most instances by providing a minimum diameter for the shelter 10 of between 5 and 20 feet. The height of the shelter 10 is optional, but ideally it should not be more than a few feet above the surface of the earth to give the shelter 10 a relatively low profile. This lessens wind resistance and thus adds to its stability over long periods of emplacement. The cover 14, which is preferably of a lightweight, flexible, translucent, vinyl plastic such as polyvinylchloride is provided with a perimeter skirt 20 extending outwardly of the base 15 contiguous with the earth's surface. To avoid upset, it is desirable to secure the frame structure 12 firmly against the earth's surface. For this purpose, a plurality of fasteners 21, such as bridge nails, may be driven downwardly into the earth through corresponding brackets 22 extending outwardly from and secured to the base 15. After the cover 14 is in place, loose earth 35 may be piled on top of the skirt 20 so as to substantially impede entry into the shelter 10 of external windblown contaminants and to confine gases exhaled over the enclosed surface area for long periods of time.

Figure 3:
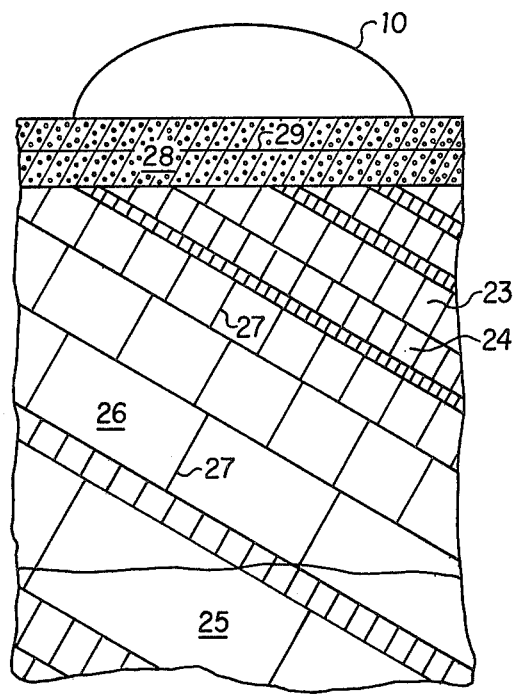
FIG. 3 is a diagrammatic representation of a gas collection shelter in accordance with this invention positioned on the earth's surface above a mineral deposit.

The advantages which accrue from the features described above for the shelter 10 will be now better understood by reference to the diagrammatic representation of FIG. 3. For illustrative purposes, it is assumed that a collection shelter 10 is positioned at the surface above a buried uranium ore deposit 25, and further, that the overburden includes a rock formation 26 characterized by a plurality of microfractures 27 and a top soil layer 28 containing an intermediate ground water level 29. If for example the rock formation 26 is of sedimentary origin, as is the case over a substantial portion of Continental land masses and over the Continental Shelf, it is laid down in successive strata or layers, such as layers or beds 23 and 24. If these layers are of differing thickness, the microfractures 27 which extend perpendicularly between their respective bedding planes may typically be separated by substantially different intervals. Radioactive gas, for example radon-222, emanating from the buried deposit 25 migrates upwardly through the rock formation 26 largely by transport through these microfractures 27 or along the bedding planes between successive layers 23 and 24. Therefore, it is hypothesized that the concentration of radon gas exiting under these circumstances into the atmosphere over a given area at the surface depends in large measure upon the presence or absence of gas exit paths from the rock formation 26 into the portion of the subsurface soil layer 28 lying vertically beneath a given surface area and upon the cross-sectional area of these paths. As the size of the given area is increased, the variation in effective area of available escape paths between surface areas substantially equidistant from the deposit 25 will decrease. Investigation of the subsurface rock in a location of interest will make it possible to estimate the pattern and character of microfractures 27 or bedding planes along which radon transport will occur, depending upon the geology of the vicinity. This may involve for example examination of fracture spacing in rock outcrops or along creek bottoms. By providing the shelter 10 with a diameter of sufficient size to insure coverage of a plurality of adjacent radon escape paths from the rock formation 26, the possibility becomes vanishingly small that any shelter 10 directly above the buried ore deposit 25 will fail to indicate a substantial concentration of radon gas. For example, if the average spacing of adjacent radon escape paths is approximately 2 feet, a shelter 10 of at least 5 feet in diameter would stand a high probability of covering some of such paths.

Figure 4:
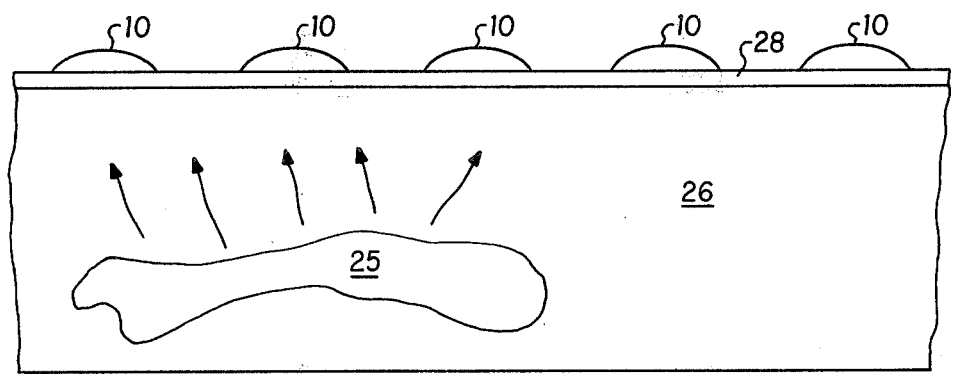
FIG. 4 is a diagrammatic view of a plurality of gas collection shelters in accordance with this invention spaced apart in connection with a prospecting operation.
Figure 5:
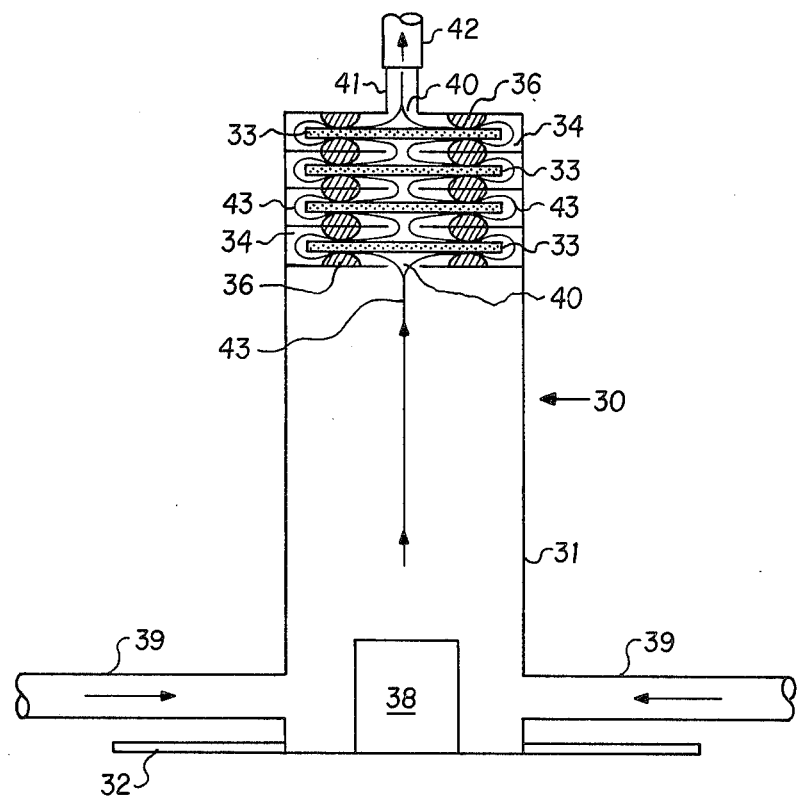
FIG. 5 is a vertical section, partially diagrammatic, of a gas collector adapted for use with a gas collection shelter in accordance with this invention.

In operation, a series of shelter 10 may be spaced apart, for example, at intervals of several hundred feet, generally in the same direction, as shown in FIG. 4. Significantly lower concentrations of radon gas found in given shelter 10 will indicate that the contour limit of the underlying ore body 25 is approached. Clearly as the size of the area covered by a shelter 10 is increased, the accuracy of this sampling technique is enhanced, the purpose always being to insure that consistently high ratings will occur near the ore body giving rise to the gas emanations and consistently low readings will occur elsewhere. Enlargement of the shelter diameter to twenty feet would insure a high degree of correspondence between the number of "covered" escape paths spaced apart as in the above example, consequently minimizing variation in gas concentration in successive shelters 10 equally close to the buried deposit 25.

Owing to the known dispersion characteristics of an isotope such as radon-222 a closer spacing of shelters 10 would be employed in prospecting for a deposit 25 estimated to be relatively shallow or if the lithology of the subsurface indicates a pattern of possible migration paths of substantially higher density. Conversely a larger spacing would be employed for ore bodies 25 estimated to be at a greater depth or having an overburden of low permeability rock.

The material of the cover 14 is selected such that it is highly permeable to infrared radiation. In addition, the shelter 10 is shaped to avoid any sharp corners tending to shadow the enclosed area of soil or to cause a reflection loss. Consistent with these design features, the shelter 10 may be formed alternatively of a section of preshaped rigid or inflatable plastic, thus eliminating the need for the frame 12. The enclosed surface will now experience heating by a greenhouse effect, and the subsurface soil temperature should be increased significantly by an amount up to 30° or 40° F each day and to a depth of 4 to 5 feet. It is recognized that a certain amount of radon gas will be trapped at the ground water level 29 by interfacial tension with the air above. Heating the soil at the surface in the manner outlined will therefore reduce this tension and free a greater percentage of gas trapped near the surface. In this manner, variations in gas dispersion into the atmosphere which might otherwise be expected with changes in pressure or moisture will be reduced.

After securing the shelters 10 in an area of interest, they are allowed to remain in place for a sufficient period of time to allow any stray airborne radon entering the shelters 10 to decay and to allow the radon gas reaching the surface from the buried deposit 25 to reach decay equilibrium. This period will be preferably about two or three half-lives for radon-222, a half-life being approximately 3.8 days or to provide a total time of about 7 to 10 days. Some gas will of course flow through the soil under the edges of the cover 14, but this volume will be small compared to the total enclosed volume of the shelter 10.

As radon gas is exhaled into the atmosphere within the shelter 10, its decay products tend to attach themselves to particulate matter or impurities in the air. This air is continuously recirculated through a collector 30 positioned within the shelter 10. The collector 30 consists of an upstanding, hollow cylindrical housing 31 supported on a base 32. The housing 31 is preferably of nonreactive plastic in the event it is used for analysis of indicator gases such as hydrogen sulfide and methane. The upper end of the housing 31 is provided with a plurality of circular discs 33, each such disc 33 being supported within a separate compartment 34. Each disc 33 is held firmly away from the surrounding inner surfaces of its respective compartment 34 by means of upper and lower spacers 37 which are adapted to permit its easy slidable insertion and removal.

A battery-operated suction fan 38 draws air continuously into the bottom of the housing 31 through radially extending open-ended tubes 39 adjacent the earth's surface. The resultant air flow is directed upwardly through central apertures 40 in the compartment 34 against the external surfaces of the discs 33. The discs 33 are preferably of granular or fibrous material such as activated charcoal which will easily adsorb the air and associated particulate matter. The flowing air will follow in part a generally circuitous path 43 in order to expose the external surface of each disc 33 in turn to such air flow and thus filter out a maximum of its decay products. Some of these products may pass directly through the body of each disc 33 in succession depending upon their constituents and thickness. As an example, a disc 33 of granular charcoal may be approximately 1/16 inch thick with a diameter of approximately 2 inches.

Figure 6:
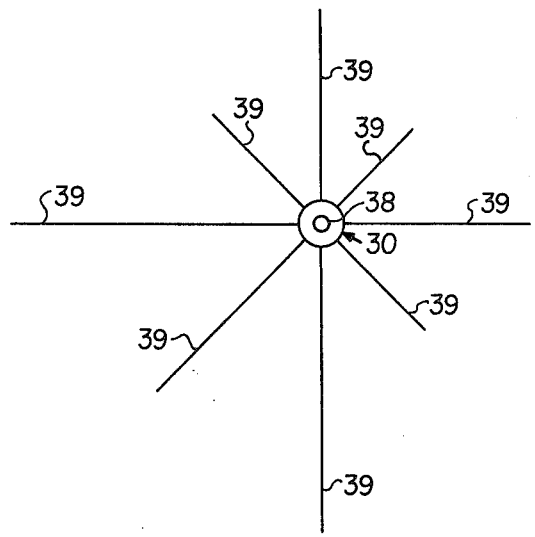
FIG. 6 is a diagrammatic plan view of the collector of FIG. 5.

The tubes 39 as seen in FIG. 6 are preferably of different lengths so as to avoid any stagnation of air at the base of the shelter 10 and thus maintain most efficient recirculation. If the collector 30 is not centrally positioned with respect to the shelter 10, the length of the tubes 39 may easily be conformed to any desired location of the collector 30 on the enclosed surface area.

As the air exits through an aperture 40 at the top of the housing 31, it passes through a tubular connector 41 from which it may be vented in any desired direction through a hose 42. In this manner, continuous recirculation of air over the discs 33 is accomplished. After decay equilibrium conditions are reached, the discs 33 may be removed and the radioactivity evidenced thereby determined by known means such as a scintillation counter or other known types of radiation detectors measuring alpha-radon decay or gamma-daughter product decay.

The utility of the shelters 10 is not limited to the collection of radon gas nor to the detection of uranium deposits. Within the scope of this invention, for example, the shelters 10 and the collector 30 may be employed in collecting helium, hydrogen sulfide, methane, and other gases. The collection of any soil gas or any gasborne particulate matter which is amenable to adsorption in the manner described is enhanced by the techniques outlined herein. While the collector 30 is preferred, within the scope of this invention, one can alternatively position a sensitive film plate (and/or thermoluminescent dosimeters) in each shelter 10 so as to detect alpha or gamma radiation. Also, it may be preferable to pump the contents of each shelter 10 directly to a remote location so long as due consideration is given to the half-life of any radioactive decay product to be analyzed. However, since pumping to a remote location may tend to pull external air through the soil into the shelter 10, it may be advisable to collapse each shelter 10 as the contained air is drawn into an external filter system. The method and apparatus of this invention may be easily adapted to an offshore environment by constructing the shelter 10 over a frame 12 of floatable material and anchoring the shelter in position with respect to some fixed offshore location. To help free radon gas from the water, it will not be difficult, by means well known to the art, to continuously spray quantities of the water into the confined atmosphere within each shelter 10.

The foregoing description is intended to be illustrative only, and those skilled in this will easily resort to modifications in the construction detailed and in the combination and arrangement of parts without departing from the spirit and scope of the invention as hereinafter claimed.

The embodiments of the invention in which an exclusive property or privilege is claimed are defined as follows:

1. The method of detection of the presence of soil gases which migrate upwardly through the earth's structure comprising the steps of:

a. enclosing respective air spaces above each of a plurality of predetermined spaced apart areas at the surface of the earth in a location of interest so that said soil gases exiting into the atmosphere over said surface areas are confined within said respective air spaces and so that external atmospheric contaminants are excluded from entry therewithin;

b. employing a like plurality of shelters for enclosing said respective air spaces, each such shelter comprising a material which is highly permeable to infrared radiation, so that said surface areas are exposed to said radiation with sufficient intensity to raise significantly the temperature of the subsoil therebeneath and thus in turn to increase the rate of escape of said soil gases from the earth; and c. measuring the level of concentration of said soil gases within said air spaces.

2. The method as claimed in claim 1 wherein said soil gases are indicative of the presence of buried mineral deposits.

3. The method as claimed in claim 1 wherein said soil gases include hydrogen sulfide, helium or methane.

4. The method of exploration for buried mineral deposits of the type having gaseous radioactive decay products which migrate upwardly through the earth's structure comprising the steps of:

a. enclosing respective air spaces above each of a plurality of predetermined spaced apart areas at the surface of the earth in location of interest so that said gaseous decay products exiting into the atmosphere over said surface areas are confined within said respective air spaces and so that external atmospheric contaminants are excluded from entry therewithin;

b. employing a like plurality of shelters for enclosing said respective air spaces, each such shelter comprising a material which is highly permeable to infrared radiation, so that said surface areas are exposed to said radiation with sufficient intensity to raise significantly the temperature of the subsoil therebeneath and thus in turn to increase the rate of escape of said gaseous decay products from the earth; and c. measuring the level of radioactivity within said air spaces after a condition of decay equilibrium has been reached.

5. The method as claimed in claim 4 wherein said shelter material is flexible, translucent, vinyl plastic.

6. The method as claimed in claim 4 wherein said shelter material is polyvinylchloride.

7. The method is claimed in claim 4 wherein each of said shelters is geometrically configured to minimize reflection of radiant energy downwardly incident thereon.

8. The method as claimed in claim 7 wherein each of said shelters is provided with a relatively low profile to lessen wind resistance.

9. The method as claimed in claim 4 including the additional steps of:

a. estimating the average density of available upward escape paths for said radioactive decay products in said location of interest and b. selecting the magnitude of each of said spaced apart surface areas in relation to said average density so that each of said surface areas encompasses a predetermined minimum number of said escape paths, thereby insuring that a substantial concentration of said radioactive decay products will collect in the air space above any of said surface areas situated directly above such a buried mineral deposit.

* * * * *